June 27, 1972 R. H. BERG 3,672,858

METHOD OF MOUNTING DISKS IN GLASS WALLS
HEAT WORKING ONLY ONCE
Filed April 17, 1970

INVENTOR.
ROBERT H. BERG

BY Hill, Sherman, Meroni, Gross & Simpson
ATTORNEYS

United States Patent Office 3,672,858
Patented June 27, 1972

3,672,858
METHOD OF MOUNTING DISKS IN GLASS WALLS, HEAT WORKING ONLY ONCE
Robert H. Berg, 196 Clinton Ave., Elmhurst, Ill. 60126
Filed Apr. 17, 1970, Ser. No. 29,390
Int. Cl. C03c *27/00*
U.S. Cl. 65—43 5 Claims

ABSTRACT OF THE DISCLOSURE

In mounting a disk in a glass wall, the glass wall is heat worked in a small area and a hole made through said heat worked area of the wall with, for example, a hot wire. The heat worked glass around the hole is removed, and the hole is enlarged without heat working to make the hole aperture size and tapered. The aperture is made large enough at one end to receive the disk and small enough at the other end so that the disc will not pass through the hole. The disk is mounted in the aperture and locked into place by heat working beads of glass around the perimeter of the disk.

This invention relates to improvements in the mounting of disks in glass walls of industrial, scientific and laboratory apparatus in which the disk is useful, for example, as a window, for controlling flow, particle measurement, and the like, and is more particularly an improvement upon the method disclosed in my Pat. 3,266,526 of Aug. 16, 1966.

Although the method of my identified patent has proved to be highly advantageous as compared to prior methods, and the resulting structure commercially quite successful, there has been an indication of room for further improvement in at least two respects. Namely, there has been a limitation upon the types of glass that would tolerate the multiple heat working of the material about the aperture within which the disk is set. Due to the bulging out of the glass wall in making the disk-receiving aperture and the manner in which the disk is then set by heat working the bulged material about the aperture back toward the original wall plane there has been a tendency to bulging or at least unevenness in the area immediately about the aperture due to excess glass and the limitations upon working the excess glass in the relatively small area of the wall involved in mounting of the disk.

By the present invention the foregoing problems have been advantageously met enabling the use of types of glass that will tolerate only limited heat working and which are frequently of lower cost, and permitting the use of a wider variety of types of glass and the selection of properties of glass for special uses. Mounting of the disk is easier, more effective and uniform and it is easier to obtain a clean-cut mounting free from projections or variable thickness in the wall area immediately adjacent the orifice in which the disk is mounted.

An important object of the present invention is to provide an improved method of mounting a disk in a glass wall.

Another object of the invention is to provide a novel method of mounting disks in glass walls which will tolerate only limited heat working while maintaining stability of coefficient of expansion.

A further object of the invention is to provide a novel method of mounting disks in glass walls attaining substantially greater uniformity and freedom from uneven, bulging surface area about the receiving aperture within which the disk is mounted.

Still another object of the invention is to attain improved, easier and more effective mounting of disks in glass walls.

Other objects, features and advantages of the present invention will be readily apparent from the following detailed description of certain preferred embodiments, taken in conjunction with the accompanying drawing in which.

Figure 1:
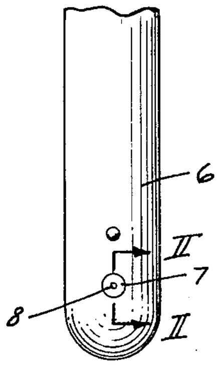
FIG. 1 is a fragmentary side elevational view of a glass vessel embodying features of the invention.
Figure 3:
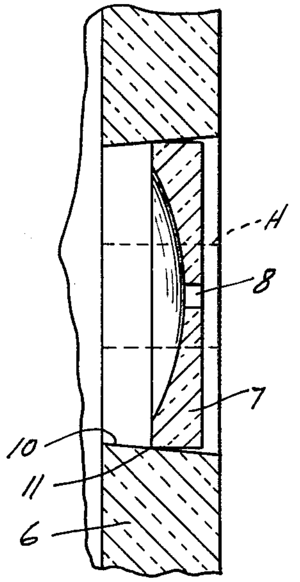
FIG. 3 is a sectional view similar to FIG. 2 but showing certain steps in the method of mounting the disk in the glass wall.
Figure 2:
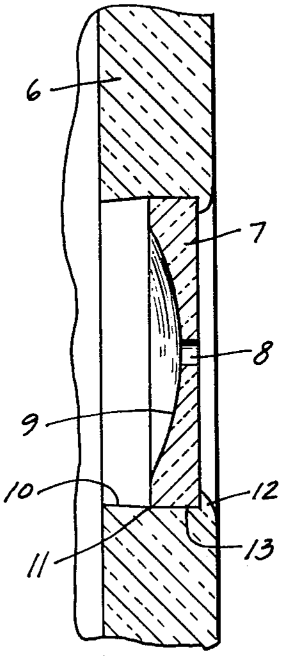
FIG. 2 is a substantially enlarged fragmentary vertical sectional detail view taken substantially on the line II—II of FIG. 1.

A glass wall 6 (FIGS. 1 and 2), which, by way of example may be part of a generally test tube receptacle, has mounted therein an orifice disk 7 having therethrough an orifice 8 providing a passage through the wall. For durability and resistance of physical and chemical deterioration, as well as to enable desirable accuracy in dimensions of the orifice 8 for whatever purpose intended, the disk 7 is made from any suitable material of higher melting point than the glass with which it is to be assembled, such as a ceramic, quartz, porcelain, spinel, sapphire, and the like, either natural or synthetic, or other mineral having desirable hardness, chemical resistance, machinability, etc. For some purposes, a metal disk may even be indicated.

For purposes of economy and strength, the disk 7 is desirably of as small diameter and ratio of diameter to thickness as may practically be useable for the intended purpose. Thus, for orifice sizes ranging from 10 to 1,000 microns, a disk diameter of about 1.5 mm. to 3.0 mm. and a rim thickness of about 0.3 mm. to 0.6 mm. may be used. Any preferred reduction in orifice length as compared to thickness of the disk is desirably attained by a concave recess 9 at one or both faces of the disk, immediately about and concentric with the orifice and substantially spaced from the perimeter of the disk, thereby leaving a relatively thick, stable rim on the disk. Such shapes formed of sapphire are readily available since they are of the basic watch jewel shape.

Mounting of the disk 7 in the wall 6 is within and across an aperture 10 extending entirely through the wall. Efficiently and advantageously the aperture is formed frusto-conically with one end initially larger than the diameter of the disk 7 and the opposite end of smaller diameter than that of the disk 7. Although the perimeter of the disk may be frusto-conically tapered complementary to the taper of the aperture 10, it is more economical to obtain the disks with cylindrical perimeters, and in mounting the disk in the aperture a peripheral corner 11 of the disk engages the tapered wall of the orifice. In some respects this peripheral corner to wall contact is advantageous in attaining sealing contact between the disk and the aperture wall when accurately sized relative to the fine line edge presented by the corner 11. Desirably, the aperture 10 is dimensioned to receive the disk 7 with its outer face set in relative to the face of the wall 6 through which the wider end of the aperture opens. Thereby a retaining projection or locking flange 12 rigid with the wall 6 may be provided within the plane of the wall face to engage the margin of the disk and to retain the disk corner 11 firmly seated against the aperture wall. By providing the locking flange 12 as a smoothly tapering or rounded outer surface annulus merging smoothly with the outer surface of the glass wall 6 cleaning maintenance about the orifice disk is facilitated which is desirable where, in use, flow is through the orifice 8 from the face of the orifice which is engaged by the locking flange 12. When thus locked in, the perimeter of the disk 7 is, in effect, held firmly within an annular groove 13 defined between the inner smaller diameter portion of the orifice wall and the locking flange 12.

In preparing the glass wall 6 for receiving the orifice disk 7, a hole H which is substantially smaller in diameter than the smallest diameter of the ultimate aperture 10 is first made through the glass wall, using any preferred glass blower's technique, most generally that of warming and softening a small area not much larger than the hole H and then poking a hot wire through the softened glass wall area. This avoids work heating of the area about the finished aperture, and more particularly avoids such heating as might change the character of the glass material of the wall to any appreciable extent at the perimeter of the aperture. Then the area about the hole H is shaped to the desired tapered aperture contour without heat working the glass, desirably by a grinding or reaming operation with a correspondingly tapered glass grinding tool. This removes any glass that has been heat worked about the preliminary hole H and enables highly accurate shaping in each circular plane, and more particularly the circular plane which will be engaged by the corner edge 11 of the disk when mounted in the taper-formed aperture 10. By thus taper-forming the wall surface of the aperture 10 substantial latitude is provided in diameter size and taper angle. The exact point of contact of the edge corner 11 along the length of the tapered aperture bore is not critical although it is desirable to have the outer surface of the disk, which is of substantially less thickness than the wall 6, close to but within the outer surface of the wall 6, where, for example, the flow is from the outer side to the inner side of the receptacle. Where flow is in the opposite direction it is a simple matter to size the aperture 10 such that the inner surface of the orifice disk will be close to the inner surface of the glass wall 6. Of course, the disk may for this purpose be turned around so that its flat face, where it has a flat face, is at the inside rather than the outside as shown. While substantial latitude is permitted in the taper angle of the aperture 10, in practice an angle of iron 3° to 6° has been found desirable. Such angle should be as small as will permit reasonable ease in mounting the orifice disk 7 within the aperture. By employment of expert glass blower's techniques, and careful attention to surface shaping absolute sealing about the perimeter of the orifice disk 7 can be attained even though there is merely simple heat working of the glass wall immediately surrounding the wide end of the aperture 10 and wetting of the fused material of the glass wall onto the engaged perimeter areas of the disk and a locking-in of the orifice disk by means of the locking shoulder or flange 12. Where desired, of course, the disk perimeter may be wetted beforehand with a bead or rim of glass compatible with the glass of the wall 6 and after mounting or laying the disk into the aperture the wetting bead and the area of the glass wall 6 about the aperture are then heated sufficiently to effect welding or fusing of the bead with the glass wall. Such fusing may be accomplished concurrently with working of the material of the glass wall about the outer end of the aperture 10 into the locking flange 12.

Figures 4, 5:
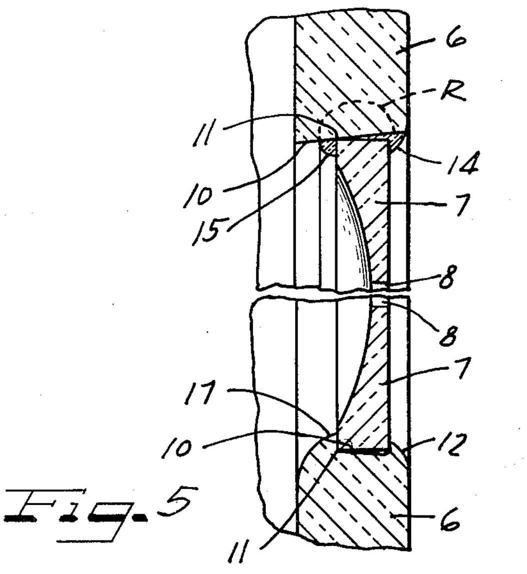
FIG. 4 is a similar view showing a modification.
FIG. 5 is another such view showing a further modification.

Instead of turning over or working in a locking flange from the glass wall, a wetting glass bead or rim R (FIG. 4) of sufficient mass may be provided on the perimeter of the disk 7 to provide material which will fuse with the wall 6 and in pliable state provide excess material at least on the outer margin of the disk to form a locking flange 14. The rim bead R of wetting material may be sufficient to provide at the inner side of the disk margin a sealing flange 15. This arrangement provides multiple assurance of tightly sealed joint between the glass wall 6 and the orifice disk 7.

With or without a wetting bead on the perimeter of the disk 7, not only may the locking flange 12 be worked onto and into retaining engagement with the margin of the disk at its outer face, but a similar locking flange 17 (FIG. 5) may be worked from the material of the glass wall 6 about the inner end of the aperture 10 into locking engagement with the inner face margin of the disk.

In all forms of the invention, only a single heat working of the material about the aperture 10 need be effected. This enables the use of types of glass which will tolerate only limited amount of heat working and which are frequently much cheaper or economical and sometimes of a variety having advantageous properties for special uses in addition to a favorable cost factor. Types of glass which have a suitable coefficient of expansion to withstand multiple work heatings are generally less available. In other words, the present invention enables the use of glass in the orifice supporting wall which retains its satisfactory stability of coefficient of expansion when subjected to only a single heat working whereas multiple heating would change the character of the glass about the aperture and create stress instability. Further, of course, any problem of excess glass about the aperture is avoided. Not only is mounting of the orifice disk simplified, but a more effective and uniform mounting thereof is enabled as compared with prior teachings.

It will be understood that variations and modifications may be effected without departing from the spirit and scope of the novel concepts of this invention.

I claim as my invention:

1. In a method of mounting a disk in an aperture in a glass wall having opposite surfaces, and particularly useful where the glass material of the wall is of a type which retains satisfactory stability of coefficient of expansion only when subjected to a single heat-working:

heat-working into said wall a hole which is substantially smaller than the ultimate size of the aperture and confining the heat-working of the wall about the hole to a concentric area inside the aperture diameter;

removing the heat-worked glass in said area about said hole, so that the glass of the wall thereabout is free from heat-worked glass, and without heat-working enlarging and shaping the perimeter defining the enlarged hole to aperture size large enough to receive said disk and tapering from a diameter at one end larger than the disk to a diameter at the opposite end smaller than the disk; and mounting said disk in the aperture and heat-working glass into locking engagement of the disk perimeter with said wall within the aperture.

2. In a method according to claim 1, warming and softening said area and making said hole by poking a hot wire through the softened area, and removing the heat-worked glass of said area by grinding without heat-working the glass.

3. In a method according to claim 1, said disk being substantially thinner than said wall and having a cylindrical perimeter which is of a diameter equal to a circular line intermediate the ends of said aperture, and placing said disk in said aperture with one corner of the disk perimeter engaging said intermediate line in the aperture before locking the disk in place in the aperture.

4. In a method according to claim 3, locking of the disk in the aperture comprising heat-working material of the wall into a locking flange marginally engaging the disk.

5. In a method according to claim 3, forming a bead of wetting glass on the perimeter of said disk, and fusing the wetting bead to said wall in the aperture.

References Cited

UNITED STATES PATENTS

| | | | |
|---|---|---|---|
| 3,266,526 | 8/1966 | Berg | 65—36 X |
| 2,894,294 | 7/1959 | Prescott | 65—43 X |

S. LEON BASHORE, Primary Examiner

R. H. ANDERSON, Assistant Examiner

U.S. Cl. X.R.

65—55, 56, 59